United States Patent [19]

Henson et al.

[11] Patent Number: 5,643,626
[45] Date of Patent: Jul. 1, 1997

[54] PROCESS FOR PRODUCING KETTLE-STYLE POTATO CHIPS

[75] Inventors: William Douglas Henson, Duncanville; William Roman Slovak, Arlington; Constantine Trifon Dalson, Irving; Brenda Dee Slay, Dallas, all of Tex.

[73] Assignee: Recot, Inc., Plano, Tex.

[21] Appl. No.: 821,311

[22] Filed: Jan. 13, 1992

Related U.S. Application Data

[63] Continuation of Ser. No. 524,960, May 18, 1990, abandoned.

[51] Int. Cl.$^6$ .................................................. A23L 1/217
[52] U.S. Cl. .................. 426/438; 99/326; 99/330; 99/331
[58] Field of Search .................. 426/233, 438, 426/441; 99/326, 328, 329 R, 331, 332, 333, 330

[56] References Cited

U.S. PATENT DOCUMENTS

| | | | |
|---|---|---|---|
| 2,767,095 | 10/1956 | Smith | 426/438 |
| 2,812,254 | 11/1957 | Smith | 99/330 X |
| 3,210,193 | 10/1965 | Martin | 426/438 X |
| 4,392,420 | 7/1983 | Caridis et al. | 426/438 X |
| 4,623,544 | 11/1986 | Highnote | 426/438 X |
| 4,704,290 | 11/1987 | Fritzsche | 426/438 |
| 4,741,912 | 5/1988 | Katz et al. | 426/438 |
| 4,801,467 | 1/1989 | Groff | 426/438 |
| 4,844,930 | 7/1989 | Mottur et al. | 426/438 |
| 4,911,068 | 3/1990 | Koether et al. | 426/438 X |
| 4,923,705 | 5/1990 | Mottur et al. | 426/438 |
| 4,929,461 | 5/1990 | Schonauer et al. | 426/438 |
| 4,956,189 | 9/1990 | Johnson | 426/438 X |
| 5,069,116 | 12/1991 | Marquez | 99/330 |

Primary Examiner—Arthur L. Corbin
Attorney, Agent, or Firm—Rothwell, Figg, Ernst & Kurz

[57] ABSTRACT

Potato chips having hardbite texture and flavor characteristics of kettle-fried potato chips are produced in an apparatus comprising a fry kettle with cooking oil circulation and heat transfer means. Production efficiency is greatly increased over conventional batch preparation of kettle-style chips; batch size is significantly increased and total fry time is advantageously decreased. In certain embodiments the batchwise preparation process includes the step of selecting texture-setting potato slice dehydration rate conditions for at least a segment of the frying time, which ends before the moisture content of the slices is reduced to about 45% by weight or less. Selecting appropriate dehydration rate conditions enables the production of potato chips of a variety of textural characteristics over varying cooking oil time/temperature profiles. After introducing a batch of potato slices into a kettle of frying oil, the potato slices are fried during the texture-setting time segment while controlling the frying to achieve the selected dehydration rate conditions. After the texture-setting time segment, the moisture content of the slices is further reduced by continuing to fry the slices in the oil to achieve a moisture content in the slices of about 2% by weight or less. Temperature may be controlled via a programmable control system.

1 Claim, 8 Drawing Sheets

PROCESS FOR PRODUCING KETTLE-STYLE POTATO CHIPS

This is a continuation of application Ser. No. 07/524,960, filed May 18, 1990, now abandoned.

BACKGROUND OF THE INVENTION

1. Field of the Invention

The present invention relates to an improved apparatus and process for the production of fried potato chips in batch-type kettles. In particular, the invention improves the efficiency of the production process by providing the ability to increase throughput and decrease fry time without diminishing the desired, characteristic "kettle-style" hardbite texture and taste of the finished product.

2. Description of the Background Art

Potato chips produced by batch processes in kettle fryers, known as kettle-style potato chips, have texture and flavor characteristics which are usually recognized by consumers as being distinctly different from typical commercially produced continuous process potato chips. Kettle fried chips are generally harder and crunchier than conventional potato chips produced in continuous fryers, and have a somewhat sweeter flavor that some consumers find more appealing than continuously fried commercial chips. In industry parlance, the hard, crunchy texture that is characteristic of kettle-fried chips is known as "hardbite" texture.

The dominant view among potato chip producers is that the batch frying method is what gives kettle-style chips their distinctive "hardbite" texture and characteristic flavor, although attempts have been made to produce kettle-style chips on a continuous basis. Van Wagner, L. R., *Snack World*, pp. 44–47, March 1989.

As the name implies, batch process kettle frying of potato chips involves placing a batch of potato slices in a kettle of hot oil (e.g., at 300°–310° F., about 150°–160° C.). Batch kettle frying of potato chips usually takes about 13 minutes to complete, during which the chips are manually stirred or raked. The need to stir or rake the chips places a constraint on the overall dimensions of the kettle fryer, as the operator must be able to reach all parts of the kettle. This constraint, in turn, limits fryer capacity as capacity is directly related to the surface area available for frying. Although mechanized stirrers are commercially available, size is still a limiting factor.

In the conventional kettle fryers used in the production of kettle-style chips, the cooking oil temperature follows a generally U-shaped time vs. temperature profile as follows. Upon introduction of the potato slices into the oil, the temperature of the oil typically drops quite rapidly by as much as 50° F. (about 28° C.) or more, and then the temperature of the oil begins to gradually rise, reaching about the initial frying temperature at the bubble end point of the chips (about 2% moisture content by weight or less). It is believed in the art that this temperature profile imparts the intense flavor and unique mouth feel characteristic of kettle-style chips. This belief is largely empirical, however, as the commercially-available kettle fryers are relatively unsophisticated equipment that are significantly constrained by burner capacity and heat transfer capacity. Thus, the observed U-shaped time/temperature profile is unavoidable with the conventional equipment, as the system cannot supply heat quickly enough to overcome the large heat sink created by the addition of a batch of raw potato slices. Changes in oil volume, initial fry temperature or potato batch weight will cause changes in temperature profile and finished product attributes. Therefore, the production of potato chips having the desired kettle-style attributes requires the adjustment of the process parameters in a manner which results in the U-shaped time/temperature profile.

Production rates using batch kettle fryers are dependent upon the equipment used. The modern kettles that are utilized in batch processes are generally manufactured of stainless steel, and vary in size and capacity. The kettles typically are heated by gas burners positioned directly under the kettle floor. Fryer capacities range from as few as 60 pounds per hour to up to 300 pounds per hour, although most batch fry operations have kettle fryers that can manufacture between 125 and 200 pounds of chips per hour. In order to efficiently use a batch kettle fryer of a given size, it is necessary to maintain a particular "load" or amount of potato slices per volume of oil, in order to produce the desired U-shaped time/temperature profile. These and other constraints provide limits on the amount of throughput using batch kettle fryers.

There remains a need in the art for improvements in the production of kettle-fried potato chips. Specifically, there remains a need for increasing the production rate and production efficiency of kettle-fried potato chips without diminishing the desired hardbite texture and flavor.

SUMMARY OF THE INVENTION

In accordance with one aspect of the present invention, an apparatus for the production of kettle-fried potato chips comprises a fry kettle having a cooking oil inlet and outlet, with a cooking oil circulation and heat transfer system in fluid communication therewith. In accordance with another aspect of the invention, a process for the production of kettle-fried potato chips which increases the overall efficiency of the chip-making process comprises placing potato slices in a fry kettle containing a cooking oil, and circulating the cooking oil through the kettle and through a remote heat transfer apparatus. In other aspects this process for preparing potato chips includes selecting potato slice dehydration rate conditions for at least a segment of the frying time, during which segment the ultimate texture of the final product is set. In this process, the texture-setting time segment ends before the moisture content of the slices is reduced to about 15% by weight, and the total moisture content of the slices at the end of the texture-setting time segment is lower than the moisture content of the slices at the beginning of the time segment by about 45% by weight or more. During the texture-setting time segment, the total moisture content of the slices is reduced by about 10% by weight per minute or less.

Potato slices are fried into kettle-style potato chips according to the present invention by introducing a batch of potato slices into a kettle of frying oil. The potato slices are fried during the texture-setting time segment while controlling the frying to achieve the selected dehydration rate conditions. The dehydration rate is controlled during the texture-setting time segment by circulating the frying oil through the remote heat transfer device so as to maintain the oil at a temperature at which the dehydration rate is about 10% by weight or less per minute. The moisture content of the slices is further reduced after the texture-setting time segment by continuing to fry the slices in the oil to achieve a final moisture content in the slices of about 2% by weight or less.

DETAILED DESCRIPTION OF THE INVENTION

The present invention has been found to greatly improve the production efficiency of batch cooked, kettle-style potato chips. This invention provides advantages over the prior art kettle frying process in that it decouples the process variables of initial oil temperature, potato batch weight and oil volume. This decoupling is accomplished by eliminating the constraints imposed by the burner size and the burner's limited heat transfer ability. The heat transfer system of the present invention allows far greater heat capacity, and the provision of oil circulation results in the efficient delivery of heat to the product. These attributes result in the present system's higher throughput and decreased fry times, compared to the prior art. In semi-automated systems of the present invention, heat delivery can be based on the real-time needs of the system and desires of the operator with respect to the characteristics of the finished product. Automation thus further increases the efficiency and flexibility of the system.

The additional flexibility provided by the present invention can be exploited in at least the following two ways:

(1) Potato batch weight is increased. Because additional heat capacity has been added to the cooking system, and heat transfer capability has been increased, batch weight can be increased while the time/temperature profile of the process (and the flavor and texture of the finished product) remain unchanged. This results in higher kettle capacity, as detailed in Examples 1 and 2.

(2) The temperature profile is modified. Our development work has shown that initial temperature is not critical to product texture as long as the subsequent dehydration rate of the potato slices, as controlled by the time/temperature profile, remains within a certain range over an initial time period. Additionally, research shows that after a certain degree of dehydration is complete, texture is set; then, temperature profile and dehydration rate can be modified independent of final product texture desired. This additional process flexibility allows the use of a time/temperature profile with a quicker temperature recovery phase, resulting in an overall shortening of the total fry time.

Figure 1:
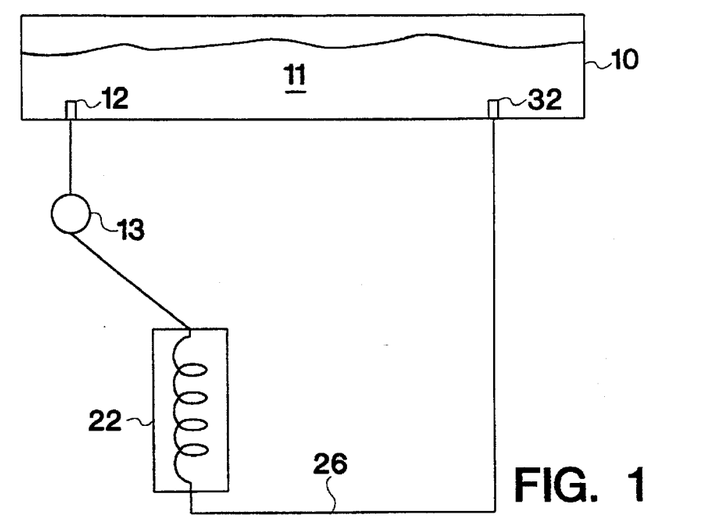
FIG. 1 is a partly schematic side elevational view of a batch kettle and oil circulating system in accordance with the present invention.

FIG. 1 schematically illustrates a batch kettle fryer system for producing kettle-style chips in accordance with the present invention. The fryer system includes a fry kettle 10 having a cooking oil 11 therein. In this system, oil is withdrawn from fryer 10 through one or more kettle outlets 12 by a pump 13. The oil flows to a steam heat exchanger 22 for heating the oil. The oil then is passed through line 26 to an oil distribution manifold 32 within kettle 10.

It has surprisingly been discovered that the prior art focus on achieving particular, U-shaped time/temperature profiles in the production of kettle-style chips has been misdirected. Also, the effect of initial frying temperature on final chip texture has been found not to be particularly important. Instead, it is the dehydration rate during a particular segment of the frying time which determines texture of the final potato chip product. It has been found that if the dehydration rate conditions are controlled as set forth herein, kettle-style chips can be produced even under widely varying time/temperature profile conditions.

Figure 5:
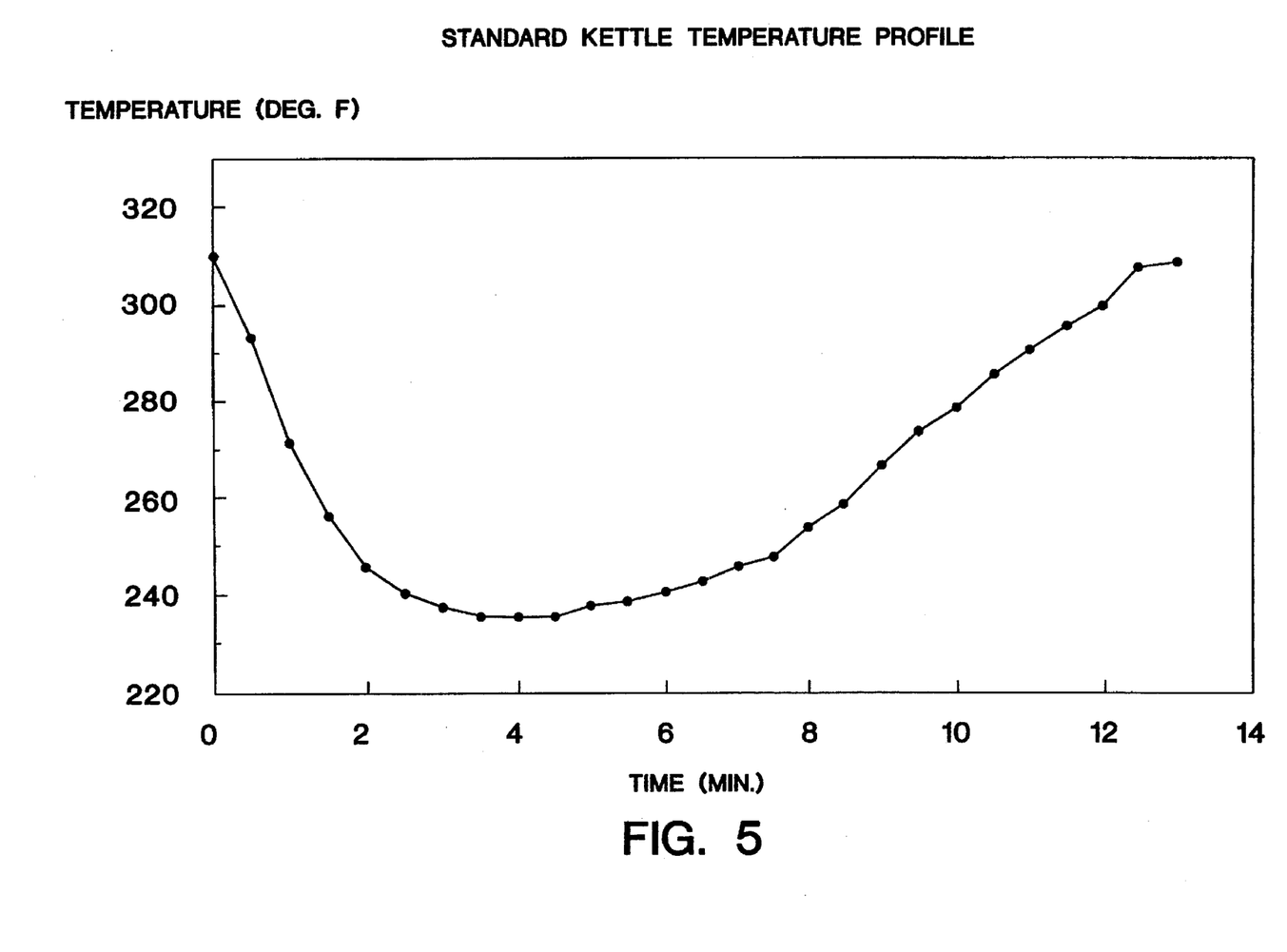
FIG. 5 graphically depicts a conventional U-shaped time/temperature profile as used in the production of kettle-style potato chips according to Example 1 herein.
Figure 8:
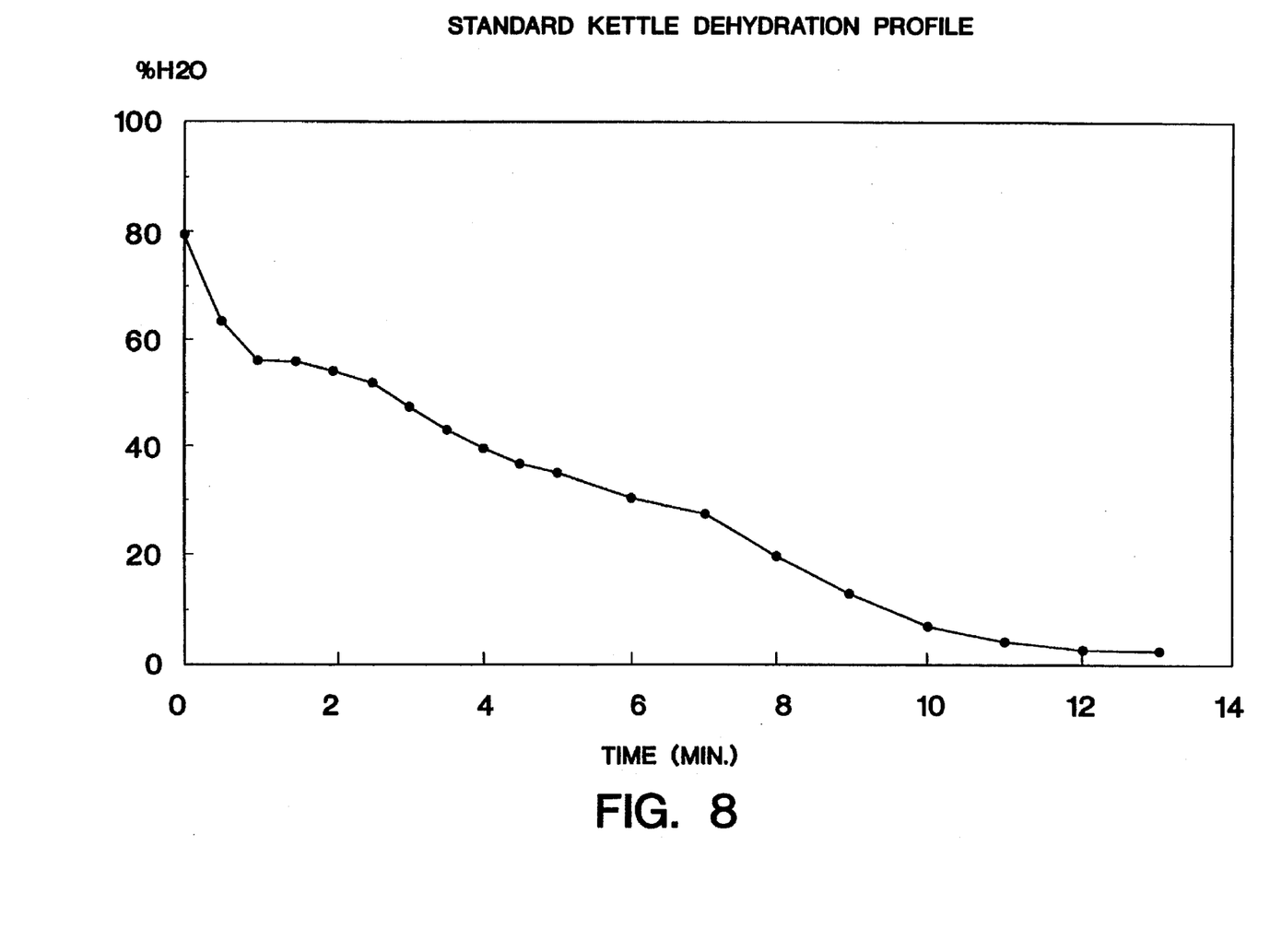
FIG. 8 graphically depicts a dehydration curve for the conventional process of Example 1 herein.

FIG. 5 illustrates the typical U-shaped time/temperature profile which has long been associated with the batchwise production of kettle-style potato chips. Example 1 herein provides details concerning a conventional batch fry process which typically yields such a profile. FIG. 8 illustrates the dehydration profile associated with this standard, prior art frying process. As seen therein, the water content of the potato slices rapidly decreases during the first minute of frying.

To produce kettle-style chips in accordance with the present invention, during at least a segment of the frying time (sometimes referred to herein as the "texture-setting time segment"), the total moisture content of potato slices is reduced by about 10% by weight per minute or less so as to reduce the moisture content of the slices during the texture-setting time segment by about 45% by weight or more. If such dehydration rate conditions are maintained before the total moisture content of the slices is reduced to about 15% by weight, the final product will have hard bite texture and flavor characteristics of kettle-style potato chips, regardless of the shape of the time/temperature profile of the overall process.

Potato slices for making potato chips according to the present invention can be formed from potatoes by any of various known devices which are available for use in slicing potatoes to be made into potato chips. Typically, whole, raw potatoes are scrubbed prior to slicing and may be either peeled or left unpeeled. Generally, individual potato slices having a thickness of from about 0.03 to 0.1 inch (about 0.75 mm to about 2.5 mm) have been found to be suitable for making into potato chips according to the process of the invention, although a slice thickness of from about 0.060 to 0.095 inch (about 1.5 mm to 2.4 mm) is preferred. After slicing, the slices may be washed to diminish the tendency of the slices to stick together or to stick to machinery during processing.

In accordance with the present invention, a batch of potato slices is introduced into a kettle of frying oil. In preferred embodiments, the initial frying temperature of the oil is about 320° F. (about 160° C.) or less. An initial oil temperature of 300°–320° F. (about 150°–160° C.) is believed to seal the outer cells of the potato slices and reduce oil uptake. Under such conditions, there will be a fast flash-off of surface water from the potato slices and, with sufficient slice loading of the oil, the oil temperature will rapidly drop.

Figure 6:
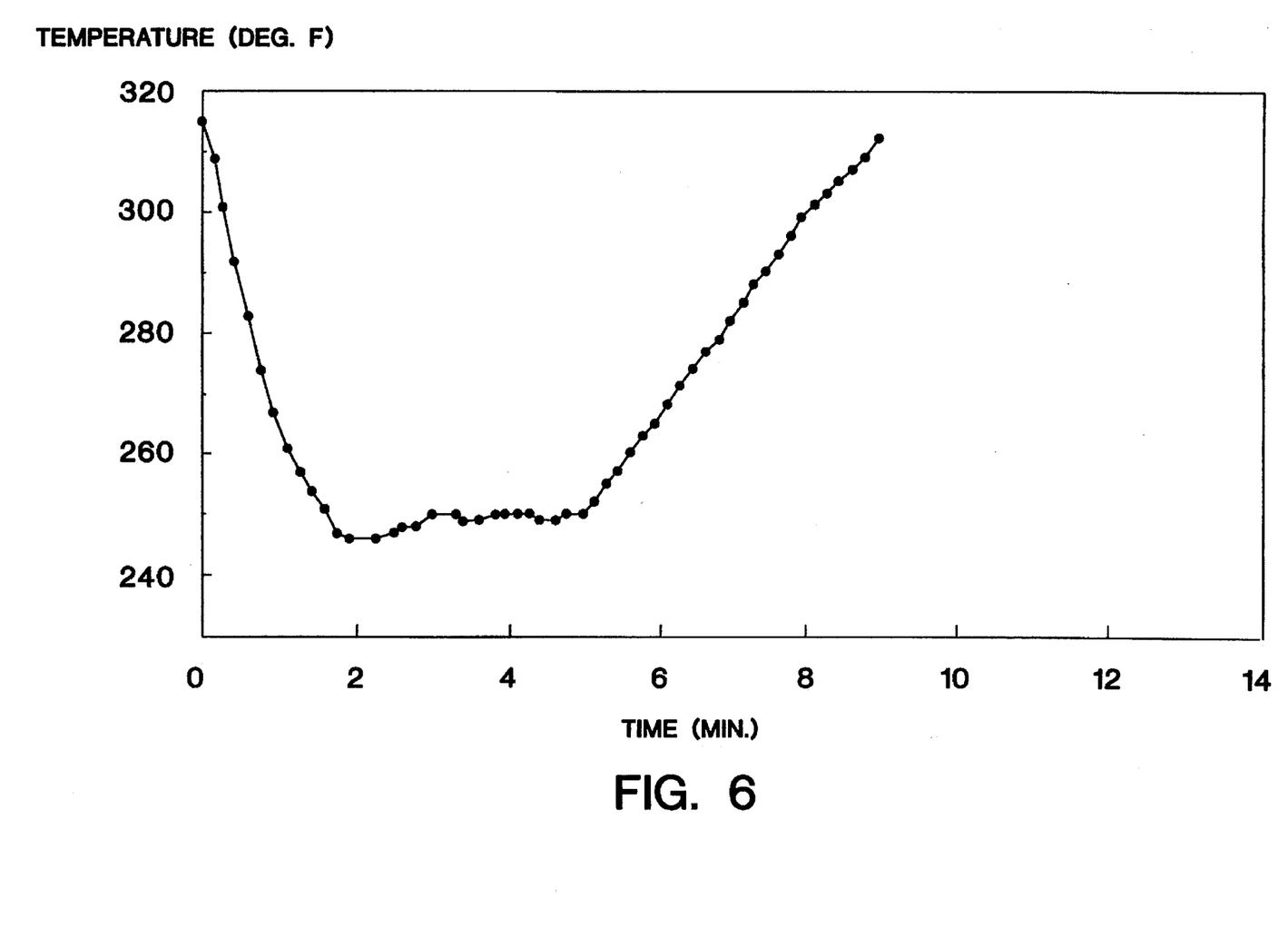
FIG. 6 graphically depicts an improved time/temperature profile as used in the production of kettle-style potato chips according to Example 2 herein.
Figure 9:
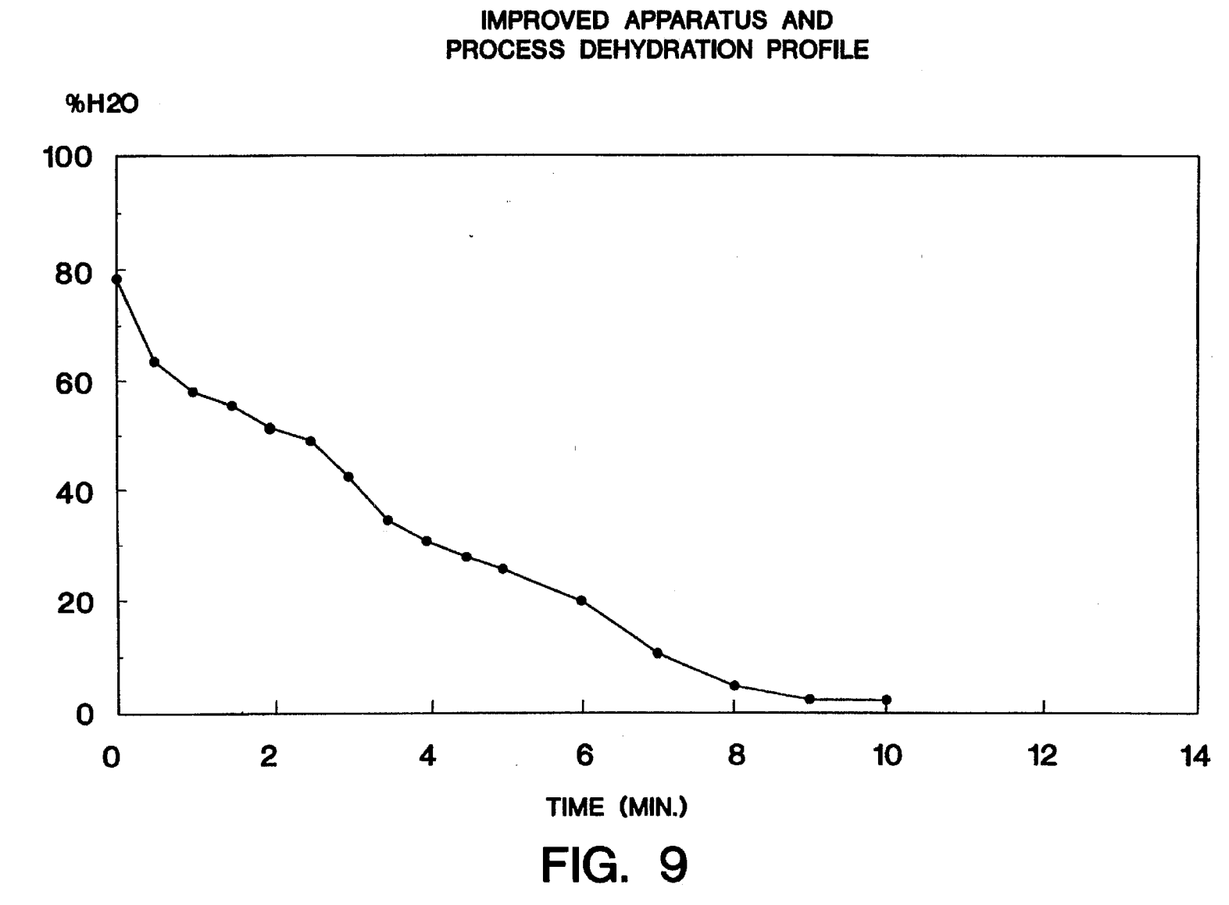
FIG. 9 graphically depicts a dehydration curve for the process of Example 2 herein.

The dehydration curve for kettle-style chips produced in Example 2 in accordance with the present invention is seen in FIG. 9. The desired rapid dehydration rate during the first minute of frying is seen therein. The time/temperature profile for this process is shown in FIG. 6. It can thus be seen that kettle-style potato chips are produced in accordance with the present invention, despite deviation from the traditional U-shaped time/temperature profile.

Figure 4:
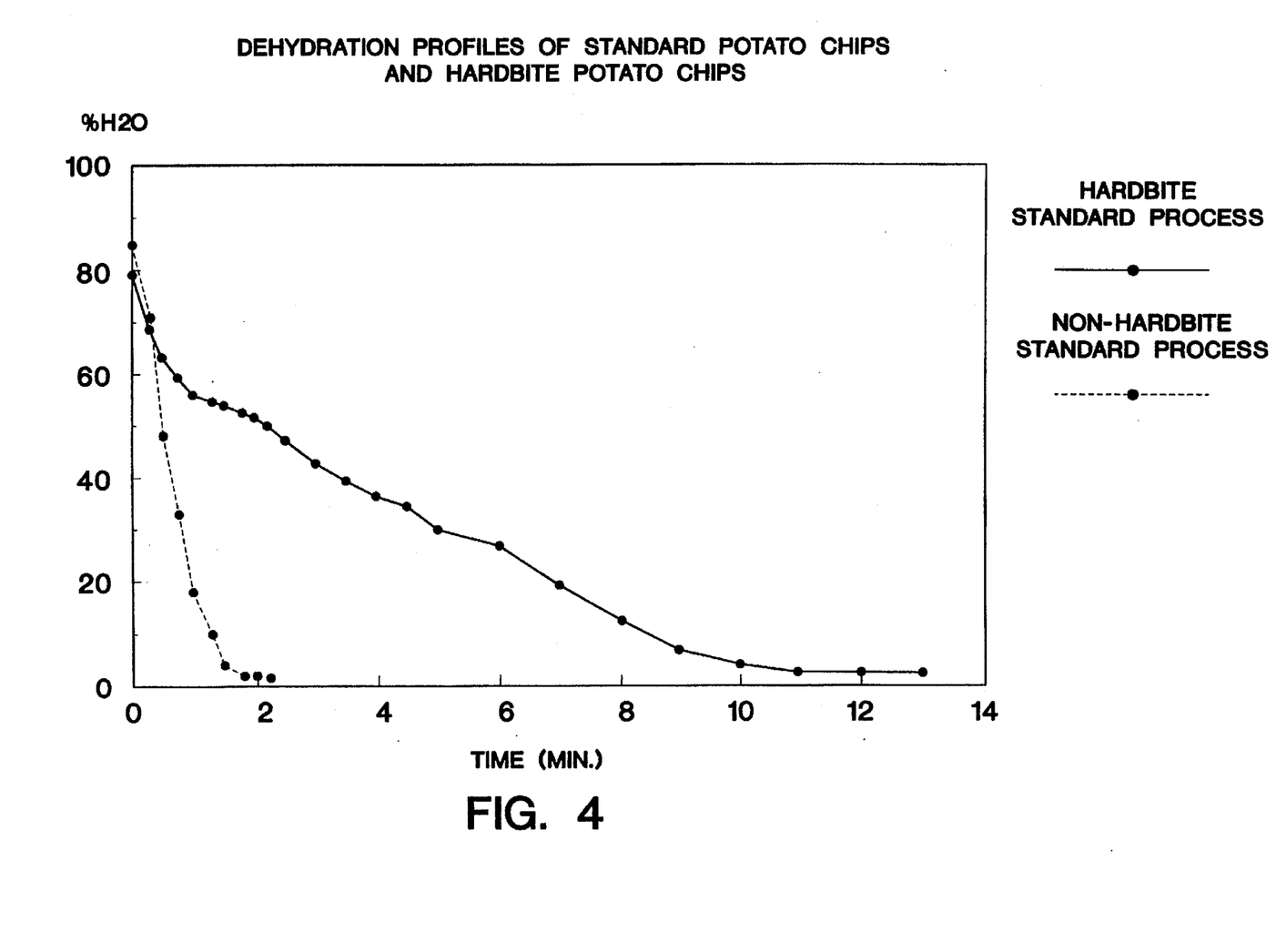
FIG. 4 graphically depicts dehydration curves for a batch kettle fried hard bite product produced via conventional processing, and for conventional continuously produced Lay's® potato chips.

As noted above, the initial frying temperature preferably is about 320° F. (about 160° C.) or less. If the initial frying temperature is too high and the chip loading is too low, it may be impossible to achieve the dehydration conditions found necessary to produce a hard bite chip. Lay's® potato chips, for example, are produced on a continuous basis by introducing potato slices into a vat of frying oil at a temperature of about 365° F. (about 185° C.). As can be seen in FIG. 4, when producing Lay's® ("non-hardbite") potato chips, the slices are substantially completely dehydrated and finished frying in as little as two minutes of frying.

The Voland texture rating is performed on a Voland Stevens Texture Analyzer, model TA-1000. This is a commercially-available instrument which measures the force required to penetrate a single potato chip with a ¼-inch diameter ball probe. Results are expressed in grams. Hardbite potato chips typically have Voland texture values of 400–700 grams. Regular potato chip products (as exemplified by Lay's® brand potato chips) typically have Voland texture values of 100–300 grams.

In order to control the frying to achieve the selected dehydration rate conditions during the texture-setting time segment of the present process, the frying oil is circulated through a remote heat transfer device such as a heat exchanger to maintain the desired dehydration rate, as hereinafter described in greater detail.

In preferred embodiments of the present invention, the texture-setting time segment during which the dehydration rate conditions are controlled occurs by the time that the total moisture content of the slices is reduced to about 30% by weight or less.

As can be seen in FIG. 4, the moisture content of typically-produced hardbite product reaches about 15% by weight after about 8 minutes of frying. During minutes 1–8 of the frying process the total moisture content of the slices is reduced by slightly more than 5% by weight per minute with the total moisture content being about 43% by weight lower at minute 8 than at minute 1 of frying. In preferred embodiments of the present invention, the time segment during which the dehydration rate conditions are controlled occurs within the first six or seven minutes of frying.

If the dehydration rate is too slow, the slices will begin to soak up oil. Accordingly, in preferred embodiments, the total moisture content of the slices is reduced during the texture-setting time segment by at least about 6% per minute. In particularly preferred embodiments, the total moisture content of the slices is reduced during the texture-setting time segment by at least about 8% per minute.

In preferred embodiments, the texture-setting time segment during which the dehydration rate is controlled has a duration of at least about four minutes. In particularly preferred embodiments, the time segment during which the hard bite texture is set occurs between about minutes 1 and 5 of frying.

Figure 7:
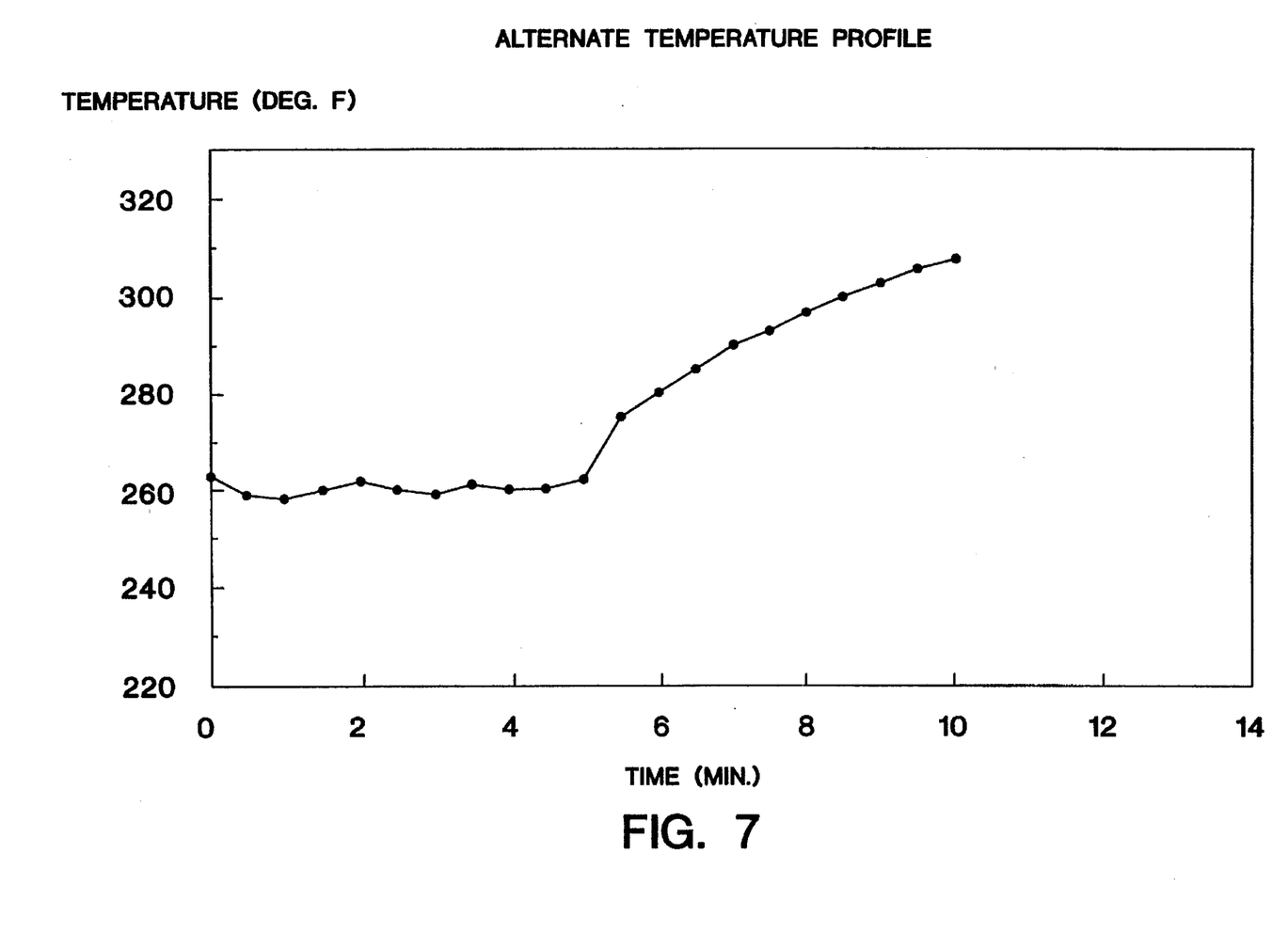
FIG. 7 graphically depicts an alternate time/temperature profile for use in the production of kettle-style potato chips according to the present invention.
Figure 10:
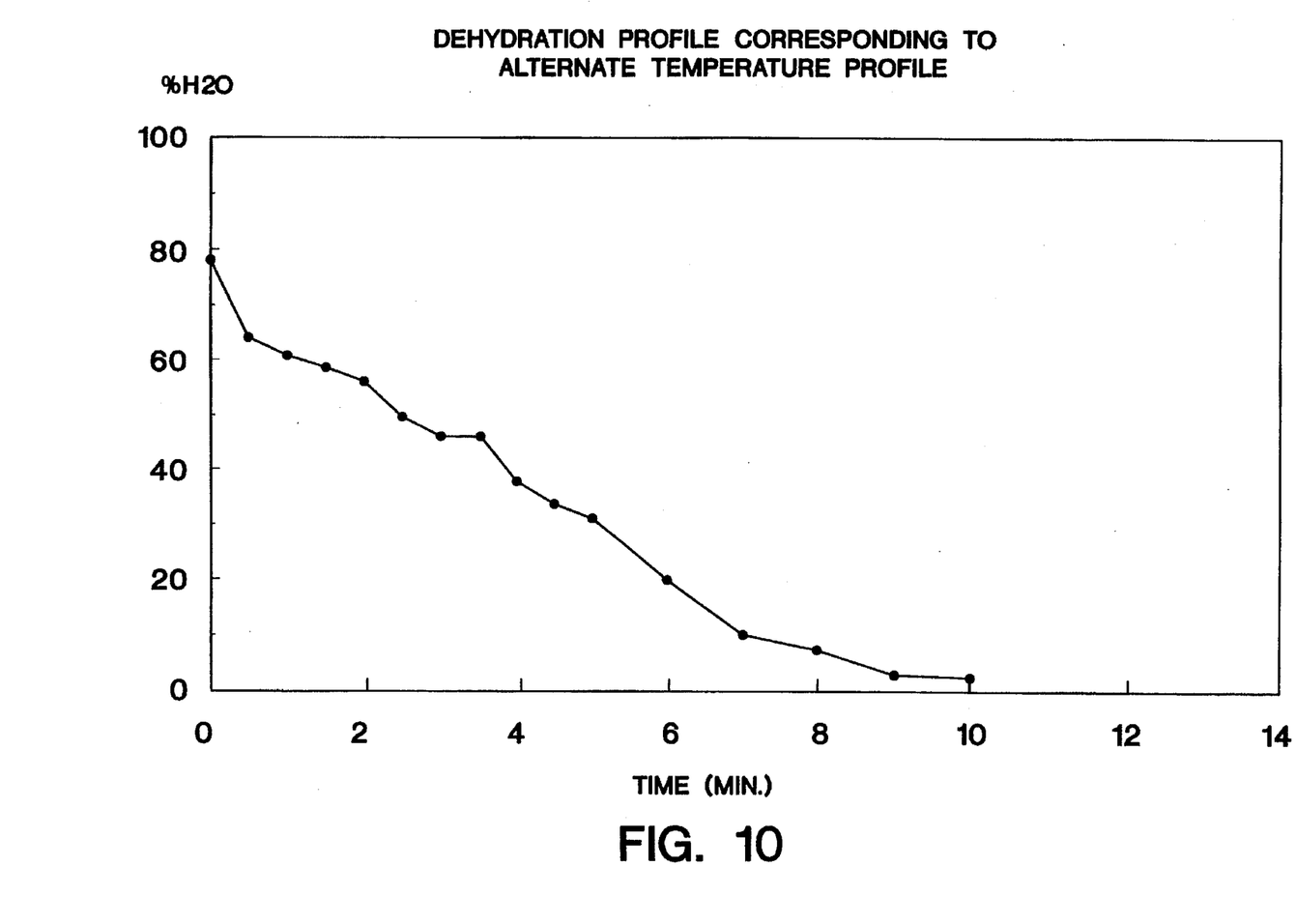
FIG. 10 graphically depicts a dehydration curve corresponding to the time/temperature profile depicted in FIG. 7.

FIG. 7 shows the time/temperature profile of another process according to the present invention. The "ramp" profile shown in FIG. 7 was achieved by having an initial frying temperature of about 260° F. (about 127°) and maintaining the oil at about that temperature for approximately five minutes by circulating the oil through a heat exchanger. After five minutes of frying, the temperature of the oil was ramped up to about 300° F. (about 150° C.) by circulating the frying oil through the heat exchanger. Despite the substantial difference between the time/temperature profile of FIG. 7 and the time/temperature profiles of FIGS. 5 and 6, the dehydration curve seen in FIG. 10, which corresponds to the process of FIG. 7, is quite similar to the dehydration curves of FIGS. 8 and 9, and markedly different from the dehydration curve for non-hardbite Lay's® brand chips as shown in FIG. 4.

Surprisingly, there are numerous time/temperature profiles that can be followed which will result in the production of a hardbite kettle-style potato chip product, so long as the hardbite dehydration rate parameters outlined above are followed during the texture-setting time segment of frying.

The U-shaped time/temperature profile shown in FIG. 5 indicates that after a substantial drop in oil temperature, the temperature of the oil begins to rise after about four minutes frying time. If frying oil is circulated through a heat exchanger and heated so as to raise the temperature of the oil after about two minutes of frying time, the resulting U-shaped time/temperature profile provides the dehydration curve shown in FIG. 9. The results show that circulating frying oil through a heat exchanger to produce distinctly different time/temperature profiles provides potato products with substantially the same textural, taste, and appearance characteristics because the dehydration rate is the common element driving the similar product qualities. Thus, after controlling dehydration rate conditions as set forth above during the texture-setting time segment of the fry, the moisture content of the slices can be further reduced by continuing to fry the slices in the oil to achieve a final moisture content of about 2% by weight or less. The oil temperature during this final frying period can vary substantially, as the dehydration rate during this period is not critical to the texture of the final product.

When controlling dehydration rate conditions in accordance with the present invention by circulating frying oil through a remote heat transfer device, batch size can be increased substantially in a kettle for a given fry time, while still producing hardbite kettle-style product. Thus, the overall efficiency of the batch frying process can be significantly increased. For example, using a batch kettle that under conventional batch frying conditions is designed to fry 120 pounds of potato slices per batch in about 13 minutes, the batch size can be increased to 200 pounds and fried for a shorter time period to produce the same hardbite kettle-style chip. Alternatively, the fry time can be further reduced with smaller batches of, for example, 150–160 pounds. The present invention thus provides a considerable increase in the efficiency of batch kettle frying.

Figure 2:
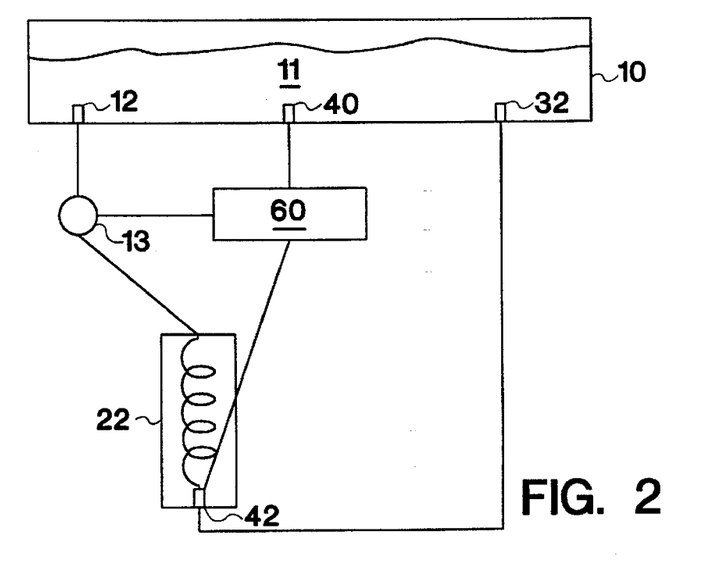
FIG. 2 is a view of a semi-automated embodiment of the invention.
Figure 3:
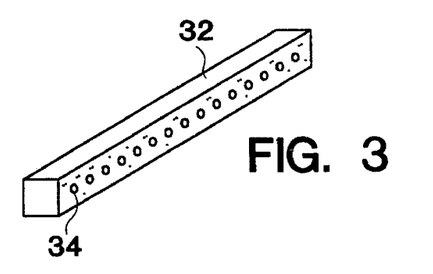
FIG. 3 is a partly schematic perspective view of a manifold for introducing recirculated frying oil into a batch kettle when practicing the process of the present invention.

The present apparatus and process readily lends itself to computer-assisted automation of the oil flow and temperature regulation operations. FIG. 2 schematically illustrates one embodiment of such a semi-automated system. Temperature sensors 40 and 42 monitor cooking oil temperature in the fry kettle and heat exchanger, respectively. Temperature information is provided to a programmable microprocessor-driven controller 60 which, according to its programming, controls the operation of pump 13 and the application of steam to the heat exchanger 22 to regulate the time/temperature profile of the potato chip production process. Those skilled in the art will be familiar with the programming, operation and modification of such an automated system; thus, it is merely illustrated schematically here.

The invention is further illustrated by the following examples, which are not intended to be limiting. All percentages are by weight unless otherwise noted.

EXAMPLE 1

Kettle-style potato chips were produced according to the standard U-shaped time/temperature profile exemplified in FIG. 5 in a conventional fry kettle having standard burners and no oil circulation system from potato slices of between 0.060 and 0.090 inch thickness. The resulting product was typical of hardbite potato chips, with a hard, crunchy texture and characteristic flavor. The following parameters were employed:

| | |
|---|---|
| Raw Potato Batch Weight | 120 lbs. |
| Potato Solids | 21.7% |
| Oil Type | Peanut Oil |
| Initial Oil Temperature | 310° F. |
| Fry Time | 13 min. 10 sec. |
| Final Moisture Content | 1.57% |
| Final Oil Content | 28.4% |
| Voland Texture | 535.6 g. |
| Color, Hunter L | 49.4 |
| Final Batch Weight | 36.3 lbs. |

EXAMPLE 2

Potato slices with a thickness of between 0.060 and 0.090 were fried in an improved apparatus according to the improved process of the present invention. FIG. 6 illustrates a typical time/temperature profile per this improved process. The apparatus employed a steam heat exchanger and an oil circulation system. The resulting product was typical of hardbite potato chips, with a hard, crunchy texture and characteristic flavor. The following parameters were employed:

| | |
|---|---|
| Raw Potato Batch Weight | 200 lbs. |
| Potato Solids | 20.5% |
| Oil Type | Peanut Oil |
| Initial Oil Temperature | 305° F. |
| Fry Time | 9 min. 50 sec. |
| Final Moisture Content | 1.62% |
| Final Oil Content | 27.9% |
| Voland Texture | 520.5 g. |
| Color, Hunter L | 48.6 |
| Final Batch Weight | 60.6 lbs. |

Since many modifications, variations and changes in detail may be made to the described embodiments, it is intended that all matter in the foregoing description and shown in the accompanying drawings be interpreted as illustrative and not in a limiting sense.

We claim:

1. A process for the batch-wise production of kettle-style potato chips, comprising placing a discrete batch of potato slices into a fry kettle containing cooking oil at a temperature of about 305° F., circulating the cooking oil through the kettle and through a remote heat transfer apparatus whereby the entire volume of oil within the kettle is maintained at a substantially uniform temperature, allowing the temperature of the cooking oil to drop during about the first two minutes of frying, then adding enough heat to maintain the temperature of the entire volume of cooking oil in the kettle at about 250° F. to 260° F. until a total of about 5 to 7 minutes of frying have elapsed, then adding heat to raise the temperature of the cooking oil to about 305° F. and ceasing frying after about 9 to 11 minutes of total fry time, at which point the total moisture content of the slices is less than about 2% by weight.

* * * * *